Dec. 11, 1951 H. SENGEBUSCH 2,578,095

MULTIDIRECTIONAL SELECTIVE SWITCH

Filed Dec. 18, 1947 6 Sheets-Sheet 1

INVENTOR.
Hans Sengebusch
BY
Smith, Olsen & Baird
Attys.

Dec. 11, 1951 H. SENGEBUSCH 2,578,095
MULTIDIRECTIONAL SELECTIVE SWITCH
Filed Dec. 18, 1947 6 Sheets-Sheet 2
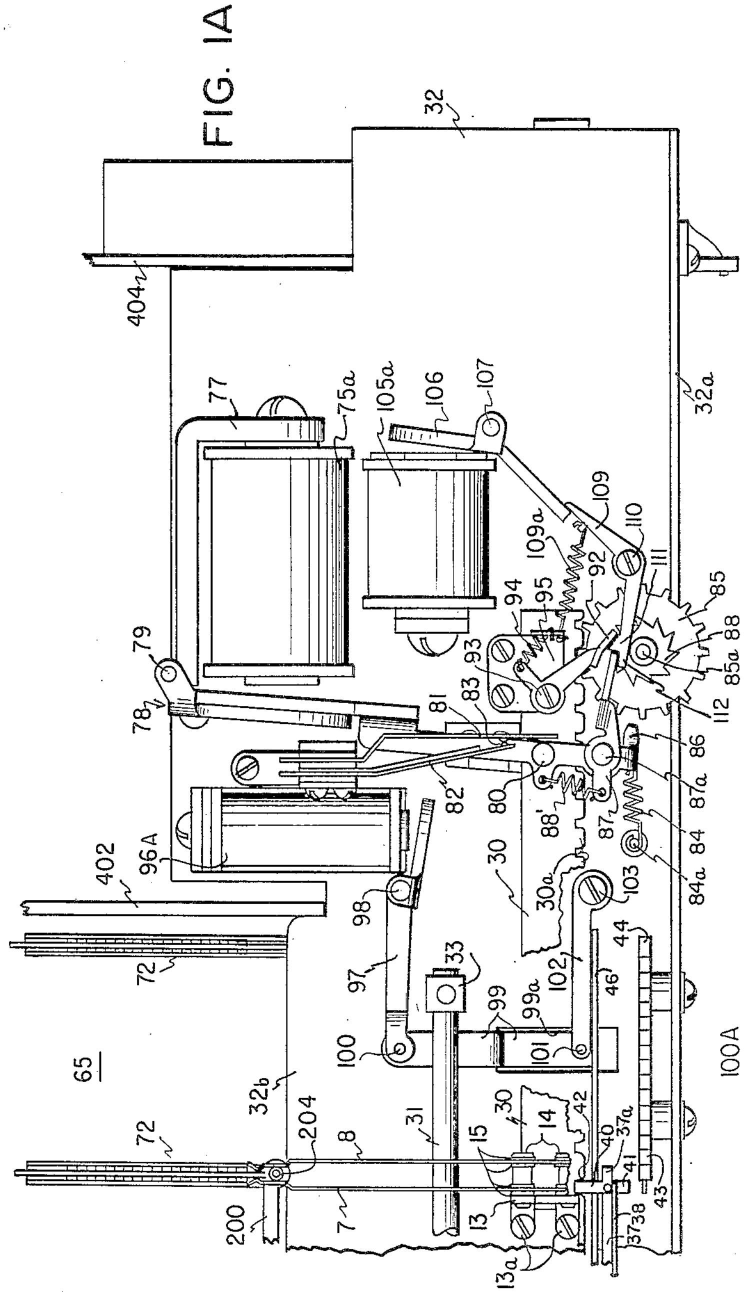
FIG. IA
INVENTOR.
Hans Sengebusch
BY
Smith, Olsen & Baird
Attys.

INVENTOR.
Hans Sengebusch
BY
Smith, Olsen & Baird
Attys.

Dec. 11, 1951 H. SENGEBUSCH 2,578,095

MULTIDIRECTIONAL SELECTIVE SWITCH

Filed Dec. 18, 1947 6 Sheets-Sheet 4

*INVENTOR.*
Hans Sengebusch
*BY*
Smith, Olsen & Baird
Attys.

Dec. 11, 1951 H. SENGEBUSCH 2,578,095

MULTIDIRECTIONAL SELECTIVE SWITCH

Filed Dec. 18, 1947 6 Sheets-Sheet 5

INVENTOR.
Hans Sengebusch

BY

Smith, Olsen & Baird

Attys.

MULTIDIRECTIONAL SELECTIVE SWITCH

Filed Dec. 18, 1947 6 Sheets-Sheet 6

INVENTOR.
Hans Sengebusch
BY Smith, Olsen & Baird
Attys.

Patented Dec. 11, 1951

2,578,095

UNITED STATES PATENT OFFICE 2,578,095

MULTIDIRECTIONAL SELECTIVE SWITCH

Hans Sengebusch, Villa Park, Ill., assignor to Automatic Electric Laboratories, Inc., Chicago, Ill., a corporation of Delaware Application December 18, 1947, Serial No. 792,510

10 Claims. (Cl. 179—27.52)

The present invention relates to switching apparatus for telephone systems, and more particularly to such apparatus of the so-called X—Y motions or flat type.

It is an object of the present invention to provide in switching apparatus of the type including a primary carriage and a secondary carriage, improved mechanism for selectively operating the primary and secondary carriages and for restoring the secondary and primary carriages.

Another object of the invention is to provide in switching apparatus of the type noted, improved mechanism of the direct drive type for selectively operating the primary and secondary carriages and for restoring the secondary and primary carriages.

A further object of the invention is to provide in automatic switching apparatus including a drive bar, improved motor means for selectively operating and for restoring the drive bar.

Further features of the invention pertain to the particular arrangement of the elements of the switching apparatus whereby the above-outlined and additional operating features thereof are attained.

Figure 1:
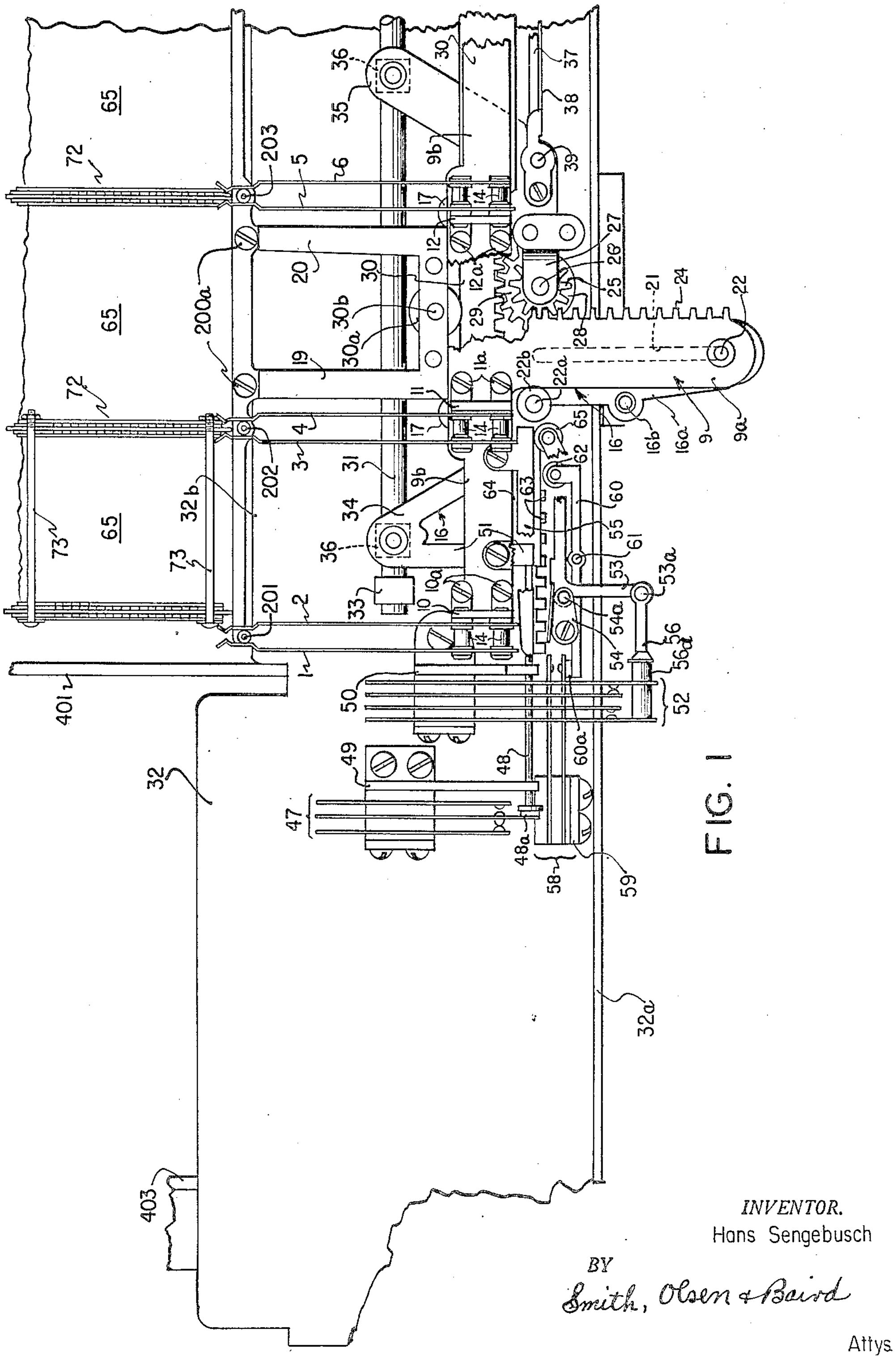
Figure 1B:
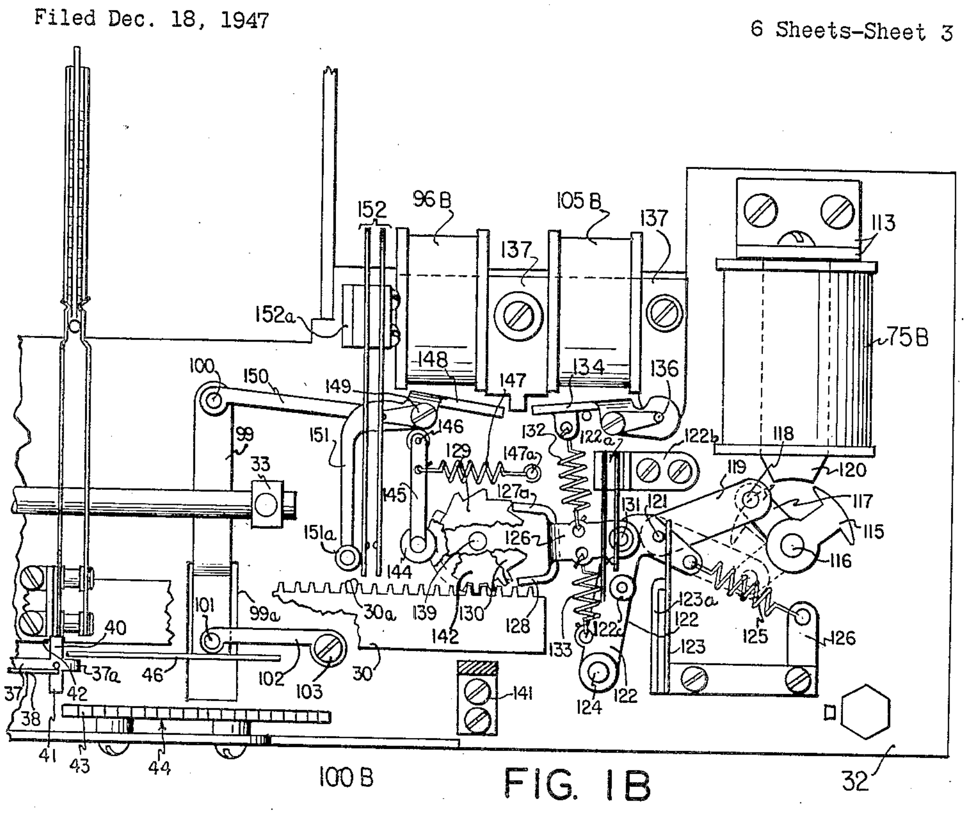
Figure 2B:
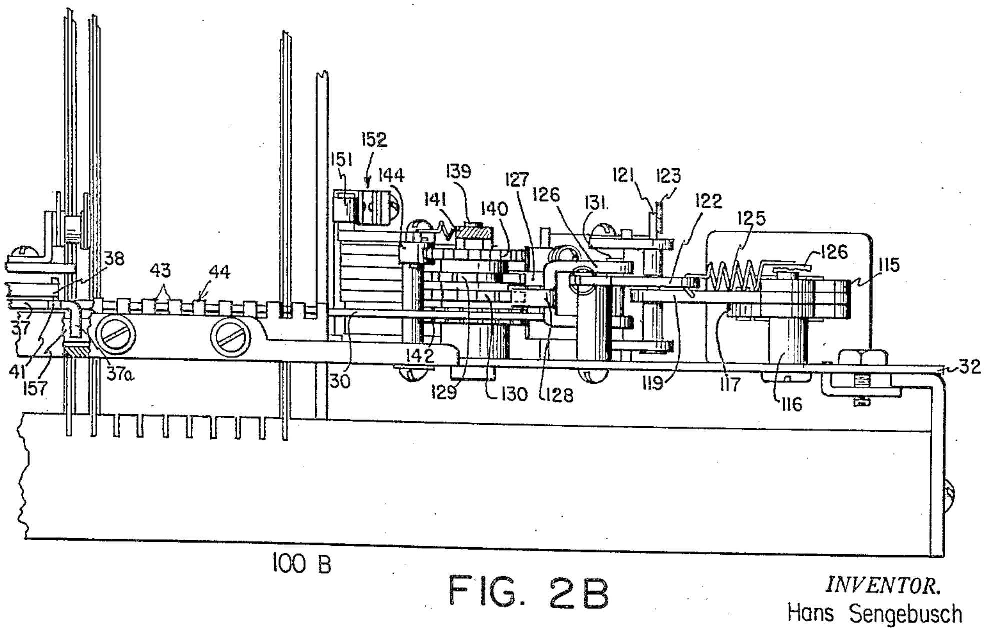
Figure 1C:
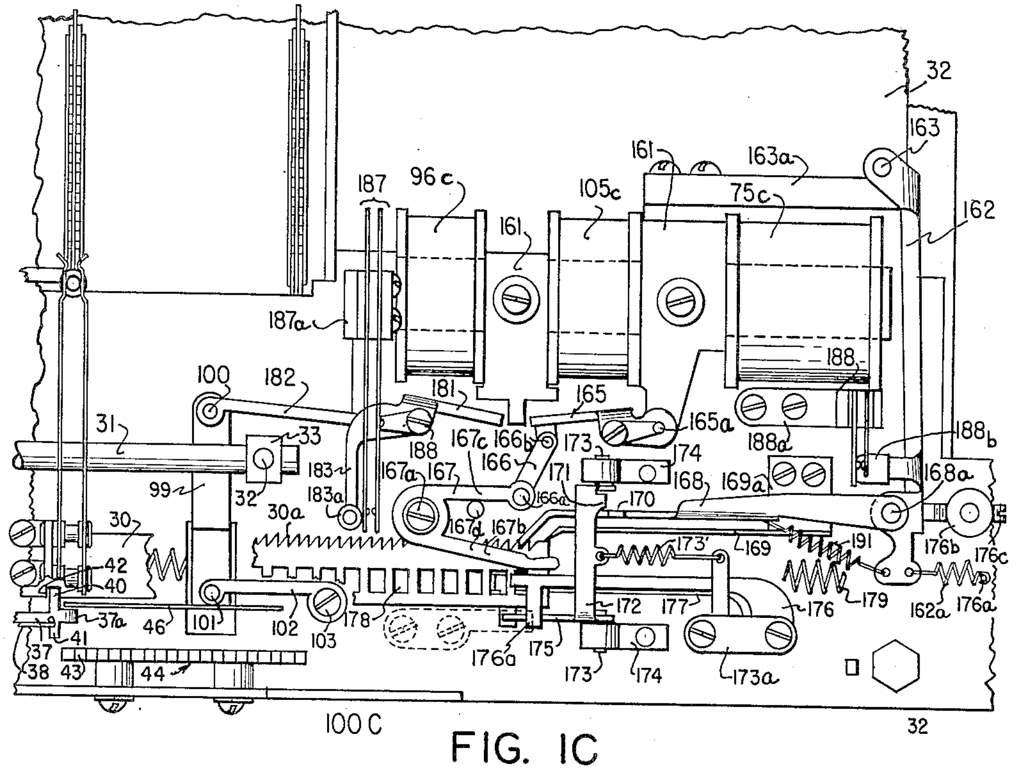
Figure 2C:
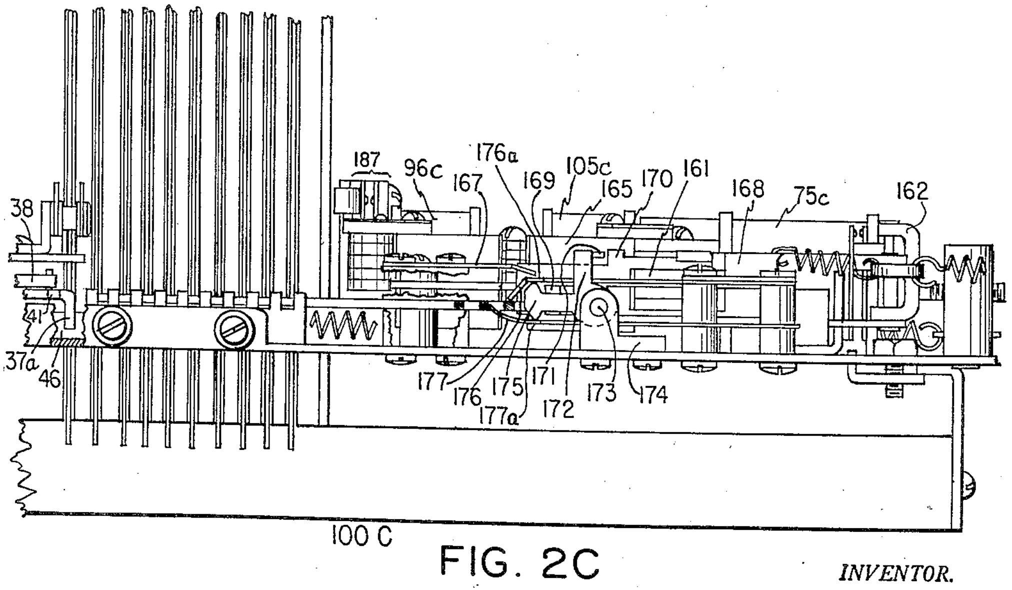
Figure 2A:
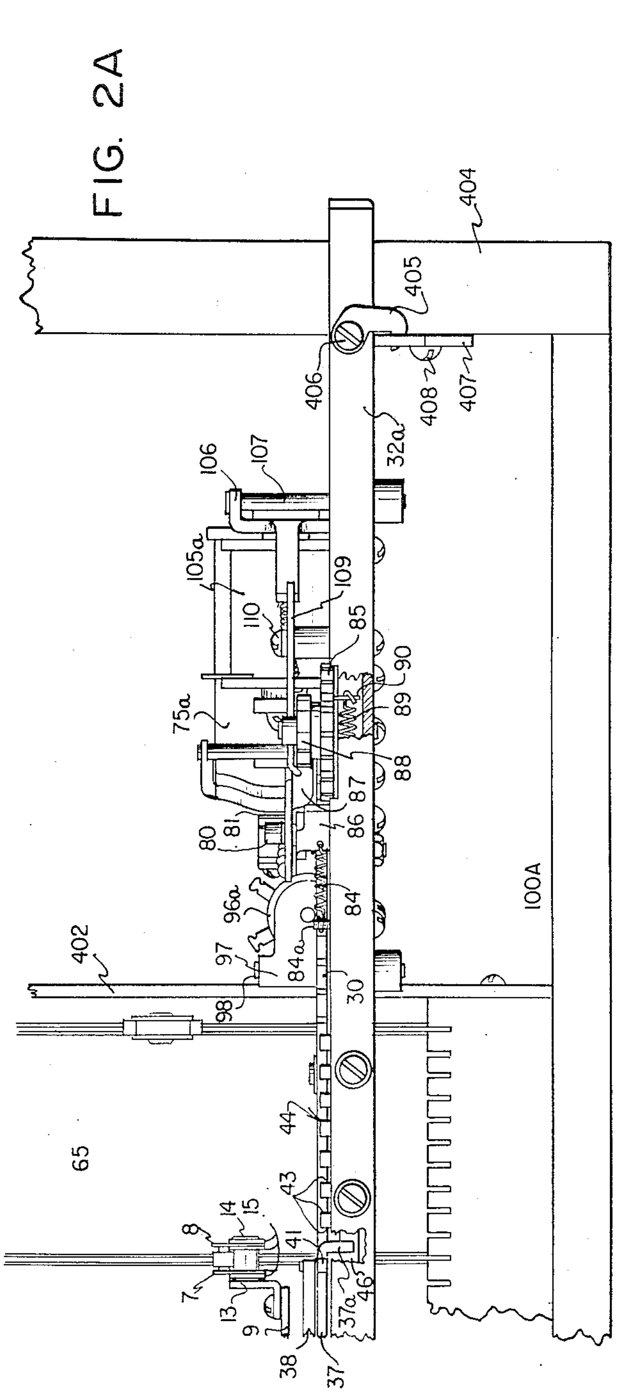
Figures 3, 4:
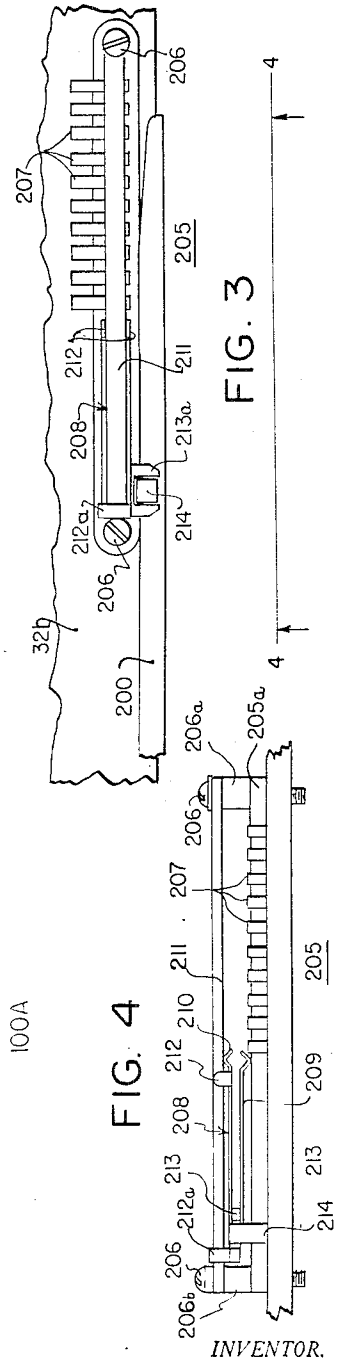
Figure 2:
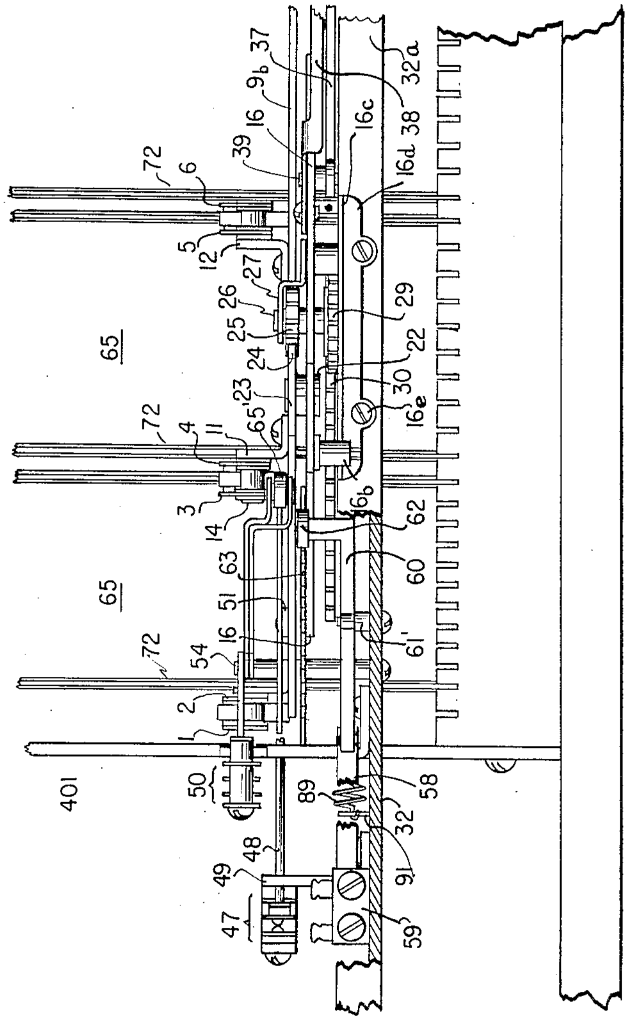
Figure 7:
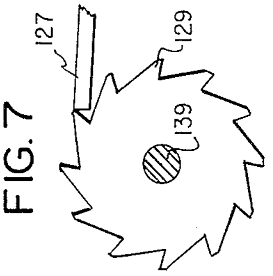
Figure 8:
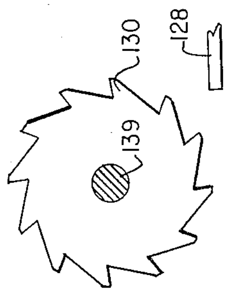
Figure 9:
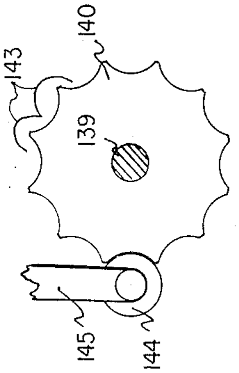
Figure 5:
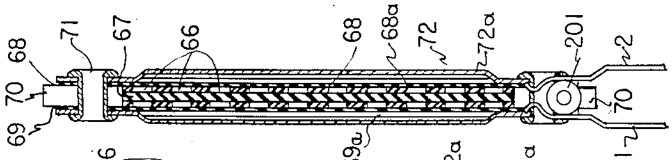
Figure 6:
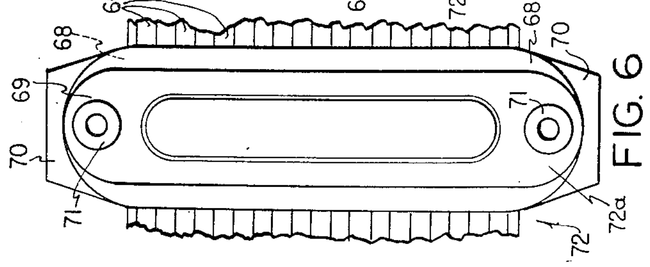

The invention, both as to its organization and method of operation, together with further objects and advantages thereof, will best be understood by reference to the following specification taken in connection with the accompanying drawings, in which Figures 1 and 1A, taken together, are a plan view, partly broken away, of a first form of switching apparatus embodying the present invention; Figs. 2 and 2A, taken together, are a front elevational view, partly broken away, of the first form of switching apparatus mentioned; Figs. 1 and 1B, taken together, are a plan view, partly broken away, of a second form of switching apparatus embodying the present invention; Figs. 2 and 2B, taken together, are a front elevational view, partly broken away, of the second form of switching apparatus mentioned; Figs. 1 and 1C, taken together, are a plan view, partly broken away, of a third form of switching apparatus embodying the present invention; Figs. 2 and 2C, taken together, are a front elevational view, partly broken away, of the third switching apparatus mentioned; Fig. 3 is a bottom view of a fragmentary central portion of the base plate of the switching apparatus shown in Fig. 1, common to the three forms thereof mentioned, illustrating the cooperation between the primary carriage thereof and an associated set of control contacts; Fig. 4 is a fragmentary inverted front elevational view, taken in the direction of the arrows along the line 4—4 in Fig. 3, of the central portion of the base plate of the switching apparatus and the associated elements; Fig. 5 is a plan view of a contact bank unit that may be associated with any one of the three forms of switching apparatus mentioned; Fig. 6 is a fragmentary end view of the unit shown in Fig. 5; and Figs. 7, 8 and 9 are plan views of three respective operating elements incorporated in the second form of the switching apparatus shown in Figs. 1B and 2B.

Accordingly, in the drawings, Figs. 1, 1A, 2 and 2A illustrate the structural details of the first form of switching apparatus; Figs. 1, 1B, 2, 2B, 7, 8 and 9 illustrate the structural details of the second form of switching apparatus; and Figs. 1, 1C, 2 and 2C illustrate the structural details of the third form of switching apparatus. Finally, Figs. 3 and 4 illustrate carriage details common to the three forms of switching apparatus mentioned; while Figs. 5 and 6 illustrate contact bank details common to the three forms of switching apparatus mentioned.

Referring now more particularly to Figs. 1, 1A, 2 and 2A, the switching apparatus there illustrated comprises the first form of the switching mechanism 100A of the direct drive type, contact bank structure 65 and supporting structure including two vertically extending and longitudinally spaced apart elements 401 and 402 and two horizontally extending and longitudinally spaced apart elements 403 and 404. The switching mechanism 100A comprises a longitudinally extending base plate 32 provided with an upwardly turned front flange 32a and a rearwardly extending apron 32b. The base plate 32 is supported upon the horizontal elements 403 and 404 and the rear edge thereof abuts the front edges of the vertical elements 401 and 402, the apron 32b being arranged between the longitudinally spaced apart vertical elements 401 and 402; whereby the normal position of the base plate 32 is accurately located by the vertical elements 401 and 402 upon the horizontal elements 403 and 404 so that the switching mechanism 100A occupies a predetermined and exact position with respect to the associated contact bank 65. The base plate 32 is normally retained in its normal position by locking devices disposed at the opposite ends thereof and cooperating with the horizontal elements 403 and 404; the locking element 405 carried by the right-hand end of the base plate 32 being illustrated. Specifically, the locking element 405 is pivotally mounted by a screw 406 upon the front flange 32a and cooperates with a locking dog 407 secured by a screw 408 to the horizontal element 404. Thus it will be understood that the base plate 32 may be readily removed with respect to the supporting structure, including the vertical elements 401 and 402 and the horizontal elements 403 and 404, merely by sliding it toward the front away from the contact bank 65 after the locking elements 405, etc., have been disengaged. Accordingly, the switching apparatus 100A may be readily placed upon and removed from the associated supporting structure for purposes of inspection and repair.

The contact bank 65 is of the 200-point or line type, each line including a positive conductor, a negative conductor and two control conductors; whereby the contact bank 65 comprises 800 individual contact strips accessible to the switching apparatus 100A. Specifically, the contact bank 65 comprises forty individual contact units 72 arranged in four groups of ten each; each individual contact unit 72 comprising twenty individual contact strips. Each individual contact unit 72 is of the bare contact strip type extending vertically in the contact bank 65. The contact bank 65 is accessible to a number of switching mechanisms including the switching mechanism 100A, carried by the supporting structure in a vertical tier; whereby the contact bank 65 serves as a multiple between the different switching mechanisms for marking purposes.

All of the elements of the switching mechanism 100A are secured to the base plate 32 so that they are properly positioned with respect to the contact bank 65 when the base plate 32 is positioned upon the supporting structure as previously explained. Specifically, the switching mechanism 100A comprises contact controlling mechanism in the form of eight main individual wipers 1, 2 and 3, 4 and 5, 6 and 7, 8; the individual wipers 1, 3, 5 and 7 constituting a first wiper set having access to 100 lines, and the individual wipers 2, 4, 6 and 8 constituting a second wiper set having access to 100 lines. Specifically, the wipers 1 and 2 may comprise positive line wipers having access to the positive line conductors of the two groups of 100 lines each; the wipers 3 and 4 may comprise negative line wipers having access to the negative line conductors of the two groups of 100 lines each; the wipers 5 and 6 may comprise first control wipers having access to the first control conductors of the two groups of 100 lines each; and the wipers 7 and 8 may comprise second control wipers having access to the second control conductors of the two groups of 100 lines each.

The two wiper sets are capable both of selective primary or longitudinal movement from the left toward the right and of selective secondary or lateral movement from the front toward the rear. Specifically, the two wiper sets are capable of ten individual steps of longitudinal movement and of ten individual steps of lateral movement. Since each of the four sections of the contact bank 65 are respectively associated with two corresponding ones of the individual wipers, each of the 200 lines is accessible to the two wiper sets. Moreover, when a given number of steps of longitudinal movement is imparted to the two wiper sets, the four corresponding contact units 72 are selected thereby; and when a given number of steps of lateral movement is imparted to the two wiper sets, eight individual contact strips comprising two lines in the four selected contact units 72 are selected. Accordingly, each combined longitudinal and lateral position of the two wiper sets corresponds to two individual lines in the contact bank 65 respectively selected by the two wiper sets. Finally, the first wiper set comprising the individual wipers 1, 3, 5 and 7 is connected by a first set of flexible conductors, not shown, to a first terminal block, not shown, carried by the base plate 32; and the second wiper set comprising the individual wipers 2, 4, 6 and 8 is connected by a second set of flexible conductors, not shown, to a second terminal block, not shown, carried by the base plate 32.

Considering now the construction of the switching mechanism 100A in greater detail, the base plate 32 carries a longitudinally extending guide rod 31, the opposite ends of which are anchored in openings formed in two blocks 33 directly secured to the upper surface of the base plate 32. A longitudinally slidable primary carriage 16 is supported upon the guide rod 31 and comprises two centrally disposed rearwardly extending arms 19 and 20 and two outer rearwardly extending arms 34 and 35, as well as a centrally disposed forwardly projecting arm 16a. The arms 34 and 35 carry downwardly projecting blocks 36 provided with openings through which the guide rod 31 extends; while the arm 16a carries a downwardly projecting fixture 16b having a longitudinally extending slot, not shown, formed in the rear edge thereof into which the upper flange 16c of a guide element 16d rides, the guide element 16d being secured by two screws 16e upon the front flange 32a of the base plate 32. Finally, the outer ends of the arms 19 and 20 carry a longitudinally extending bracket 200 disposed adjacent to the rear edge of the apron 32b; the bracket 200 being secured to the outer ends of the arms 19 and 20 by two screws 200a. The primary carriage 16 has a normal longitudinal position toward the left and is capable of longitudinally sliding movement toward the right; the primary carriage 16 being guided in its primary movement by the cooperation between the fixture 16b carried by the arm 16a and the flange 16c of the guide element 16d carried by the front flange 32a of the base plate 32 and by the cooperation between the blocks 36 carried by the arms 34 and 35 and the guide rod 31.

A laterally slidable secondary carriage 9 is carried by the primary carriage 16; the secondary carriage 9 being substantially T-shaped having a forwardly projecting stem 9a overlying the arm 16a of the primary carriage 16 and a longitudinally extending head 9b overlying the arms 34 and 35 of the primary carriage 16. The outer end of the stem 9a carries a downwardly extending rivet 22 provided with a groove positioned in a laterally extending slot 21 formed in the arm 16a. Also the left-hand side of the arm 16a carries an upstanding pin 22a carrying a roller 22b engaging the left-hand edge of the stem 9a. Finally, two rollers 17 are mounted on the lower surface of the head 9b and respectively engage the outer edge of the arm 19 and the outer edge of the arm 20. The secondary carriage 9 has a normal lateral position toward the front and is capable of lateral sliding movement with respect to the primary carriage 16; the lateral sliding movement being guided by the cooperation between the rivet 22 and the slot 21 by the cooperation between the roller 22b and the adjacent edge of the stem 9a and by the cooperation between the rollers 17 and the adjacent outer edges of the arms 19 and 20.

The head 9b of the secondary carriage 9 carries four longitudinally spaced apart brackets 10, 11, 12 and 13 respectively secured thereto by screws 10a, 11a, 12a and 13a. The bracket 10 carries two rivets 14 supporting the main wipers 1 and 2 in longitudinally spaced apart relation with respect to each other by virtue of an arrangement including a plurality of intervening insulating strips; the bracket 11 carries two rivets 14 supporting the main wipers 3 and 4 in longitudinally spaced apart relation with respect to each other by virtue of an arrangement including a plurality of intervening insulating strips; the bracket 12 carries two rivets 14 supporting the main wipers 5 and 6 in longitudinally spaced apart relation with respect to each other by virtue of an arrangement including a plurality of intervening insulating strips; and the bracket 13 carries two rivets 14 supporting the main wipers 7 and 8 in longitudinally spaced apart relation with respect to each other by virtue of an arrangement including a plurality of intervening insulating strips. The bracket 200 carries four longitudinally spaced apart upstanding insulating bushings 201, 202, 203 and 204 disposed between the respective pairs of main wipers 1, 2 and 3, 4 and 5, 6 and 7, 8 in order to maintain the individual wipers of each pair out of contact with each other when they occupy their fully retracted positions toward the front of the base plate 32.

The primary carriage 16 comprises a normal longitudinal position and may be moved step by step therefrom in the longitudinal direction from the left toward the right as previously noted; and the secondary carriage 9 comprises a normal lateral position and may be moved step by step therefrom in the lateral direction from the front toward the rear as previously noted. In order to accomplish these movements of the primary carriage 16 and of the secondary carriage 9, an arrangement is provided comprising a longitudinally extending drive bar 30 in the form of a rack having a normal longitudinal position toward the left and capable of stepped movement in the longitudinal direction toward the right. The longitudinal movement of the rack 30 is guided by a stationary fixture 95 secured to the right-hand end of the base plate 32 and having a slot formed therein receiving and guiding the right-hand end of the rack 30 and by a roller 30a mounted upon a pin 30b carried by the primary carriage 16. The rack 30 is normally restrained in its normal longitudinal position toward the left by a coil spring 89, one end of the coil spring 89 being secured to a pin 91 carried by the base plate 32 and the other end of the coil spring 89 being secured to a pin 90 carried by the rack 30.

The primary carriage 16 has an opening 28 formed therein through which a vertically disposed pin 26 extends, the upper end of the pin 26 being arranged in an opening formed in a bracket 27 secured to the primary carriage 16 and the lower end being secured to a lower fixture, not shown, carried by the primary carriage 16. Upper and lower gears 25 and 29 are rigidly secured to the pin 26, the lower gear 29 meshing with the teeth provided on the front side of the rack 30 and the gear 25 meshing with teeth provided on a rack portion 24 of the stem 9a. Accordingly, the secondary carriage 9 comprises the rack 24 meshing with the gear 25 carried by the pin 26, and the rack 30 meshes with the gear 29 carried by the pin 26.

Further the primary carriage 16 carries a downwardly projecting pivot pin 39 supporting the left-hand end of a latch lever 37 as well as a leaf spring 38 urging the latch lever 37 in the counterclockwise direction about the pivot pin 39. The right-hand end of the latch lever 37 carries a rearwardly projecting latch 40 normally engaging a notch 42 formed in the front edge of the rack 30 and a forwardly projecting latch 41 adapted to engage any one of ten notches 43 provided in an upstanding latch plate 44 secured to the front flange 32a adjacent to the right-hand end thereof. The notches 43 formed in the latch plate 44 are spaced apart distances corresponding to the longitudinal steps of the primary carriage 16. Accordingly, it will be understood that the leaf spring 38 normally urges the latch 40 into the notch 42 formed in the rack 30 thereby latching the primary carriage 16 to the rack 30. In order to control the position of the latch lever 37, an arrangement is provided comprising a shift magnet 96A provided with magnetic structure secured to the right-hand end of the base plate 32. The shift magnet 96A carries a pivot pin 98 upon which an armature 97 is mounted, the outer end of the armature 97 carrying a pin 100 to which the rear end of a slide 99 is secured. The body portion of the slide 99 is bent downwardly and arranged in a guiding opening 99a formed in the base plate 32 and the front end of the slide 99 carries a pin 101 to which the left-hand end of a lever 102 is secured, the right-hand end of the lever 102 being secured to a screw 103 carried by the base plate 32. Finally, the front end of the slide 99 carries a longitudinally extending upstanding trip 46 disposed between the front of the rack 30 and a downwardly projecting lug 37a formed on the extreme right-hand end of the latching lever 37. Accordingly, the leaf spring 38 not only biases the latching lever 37 in the counterclockwise direction about the pivot pin 39, but it also causes the lug 37a carried thereby to engage the trip 46 and urge it toward the rear; whereby the slide 99 is moved toward the rear rotating the lever 102 in the clockwise direction about the screw 103 and rotating the armature 97 in the clockwise direction about the pivot pin 98.

In order to control movement of the rack 30 from its normal longitudinal position toward the right, an arrangement is provided comprising a drive magnet 75A provided with magnetic structure including a heel piece 77 secured to the right-hand end of the base plate 32. The heel piece 77 carries a pivot pin 79 upon which an armature 78 is pivotally mounted. Also the right-hand end of the base plate 32 carries an upstanding pin 85a upon which an upper ratchet 88 and a lower gear 85 are journaled, the ratchet 88 being rigidly secured to the gear 85. The teeth provided on the gear 85 engage corresponding teeth 30a formed on the front edge of the rack 30; and the ratchet 88 cooperates with a pawl 87 carried by the armature 78. More particularly, the pawl 87 is pivotally mounted on a pivot pin 87a disposed on the outer end of the armature 78 and is normally biased in the clockwise direction about the pivot pin 87a into engagement with the ratchet 88 by an arrangement comprising a coil spring 88′ extending between the armature 78 and the outer left-hand end of the pawl 87. The armature 78 is normally biased in the clockwise direction about the pivot pin 79 by an arrangement including a coil spring 84, one end of the coil spring 84 being secured to an upstanding pin 84a carried by the base plate 32 and the other end of the coil spring 84 being secured to the extreme outer end of the armature 78. Also the extreme outer end of the armature 78 carries a detent 86 adapted to cooperate with the teeth on the gear 85 in a manner more fully explained hereinafter. Further a detent 92 is pivotally mounted upon the fixture 95 by a pivot pin 93 and is normally biased in the clockwise direction into engagement with the ratchet 88 by an arrangement including a coil spring 94 extending between the detent 92 and the fixture 95.

Further the switching mechanism 100A comprises a release magnet 105A provided with magnetic structure secured to the right-hand end of the base plate 32. The release magnet 105A is provided with an armature 106 mounted upon a pivot pin 107 carried by the base plate 32 and cooperating with a release dog 109 mounted upon a pivot pin 110 carried by the base plate 32. The release dog 109 is normally biased in the counterclockwise direction about the pivot pin 110 by an arrangement including a coil spring 109a extending between the release dog 109 and the fixture 95. The left-hand end of the release dog 109 comprises two fingers 111 and 112 respectively disposed between the detent 92 and the ratchet 88 and between the pawl 87 and the ratchet 88.

Considering now the operation of the switching mechanism 100A, the primary carriage 16 normally occupies its normal longitudinal position toward the left; the secondary carriage 9 normally occupies its normal lateral position toward the front; and the rack 30 normally occupies its normal longitudinal position toward the left. Moreover, the latch lever 37 is normally biased by the leaf spring 38 in the counterclockwise direction about the pivot pin 39; whereby the latch 40 engages the notch 42 formed in the rack 30 locking the primary carriage 16 to the rack 30. At this time, when the winding of the drive magnet 75A is energized, the armature 78 is attracted and rotated in the counterclockwise direction about the pivot pin 79 against the bias of the coil spring 84, whereby the pawl 87 engaging the associated tooth on the ratchet 88 rotates the ratchet 88 and consequently the gear 85 one step in the clockwise direction about the pivot pin 85a. At the end of the stroke, the detent 86 formed on the outer end of the armature 78 engages the associated tooth on the gear 85 preventing further rotation thereof in the clockwise direction. Also, at this time, the detent 92 urged by the coil spring 94 rides over one tooth on the ratchet 88 and engages the next adjacent tooth thereon, thereby to prevent return movement of the ratchet 88 in the counterclockwise direction. When the winding of the drive magnet 75A is then deenergized, the armature 78 is released and rotated in the clockwise direction about the pivot pin 79 by the coil spring 84, the detent 86 disengaging the associated tooth on the ratchet 88 in order to condition the pawl 87 to drive the ratchet 88 an additional step in the clockwise direction. When the gear 85 is thus rotated one step in the clockwise direction, the teeth thereon engaging the teeth 30a on the rack 30 slide the rack 30 from its normal longitudinal position one step toward the right against the bias of the coil spring 89. When the rack 30 is thus driven from its normal longitudinal position one step toward the right, the primary carriage 16 latched thereto by the latch 40 moves therewith from its normal longitudinal position one step toward the right. When the primary carriage 16 is driven away from its normal longitudinal position one step toward the right, the two wiper sets are brought into longitudinal alignment with respect to the two corresponding first groups of ten lines in the two 100-line groups in the associated contact bank 65. Thus it will be understood that by energizing the winding of the drive magnet 75A a number of times, while the primary carriage 16 is latched to the rack 30 by the latch 40, the primary carriage 16 is driven a corresponding number of steps away from its normal longitudinal position toward the right in order to cause the two wiper sets to select the two corresponding groups of ten lines in the two 100-line groups in the associated contact bank 65.

After the primary carriage 16 has been operated as described above the required number of steps away from its normal longitudinal position, the winding of the shift magnet 96A is energized; whereby the armature 97 is attracted and rotated in the counterclockwise direction about the pivot pin 98 moving the slide 99 toward the front of the base plate 32 through the pin 100. When the slide 99 is thus moved toward the front of the base plate 32 the lever 102 is rotated about the screw 103 due to the connection of the slide 99 thereto by the pin 101; whereby the trip 46 is moved toward the front flange 32a rotating the latch lever 37 in the clockwise direction about the pivot pin 39 against the bias of the leaf spring 38 due to the engagement between the trip 46 and the lug 37a carried by the latch lever 37. More particularly, when the primary carriage 16 is moved away from its normal longitudinal position one or more steps in the longitudinal direction toward the right, the latch lever 37 is moved therewith and into alignment with a corresponding one of the notches 43 formed in the latch plate 44. Accordingly, at this time when the latch lever 37 is rotated by the trip 46 in the clockwise direction about the pivot pin 39, the latch 40 disengages the notch 42 formed in the rack 30 and the latch 41 engages the aligned notch 43 formed in the latch plate 44; hence, the primary carriage 16 is unlatched from the rack 30 by the disengagement of the latch 40 and the notch 42; and the primary carriage 16 is latched against further movement in the longitudinal direction by the engagement between the latch 41 and the aligned notch 43.

At this time while the winding of the shift magnet 96A is energized, the winding of the drive magnet 75A is energized; whereby the armature 78 causes the pawl 87 to drive the ratchet 88 an additional step in the clockwise direction causing the gear 85 to drive the rack 30 an additional step in the longitudinal direction toward the right. At this time the smooth front surface of the rack 30 disposed between the teeth 30a formed on the right-hand end thereof and the teeth formed on the left-hand end thereof engaging the gear 25 rides to the right past the latch 40; whereby the notch 42 formed in the rack 30 is no longer aligned with respect to the latch 40. At this time the winding of the shift magnet 96A may be deenergized in order to release the armature 97; whereby the armature 97 is rotated only through a small angle in the clockwise direction about the pivot pin 98 since the slide 99 is not forced rearwardly by the leaf spring 38 acting through the latching lever 37 and the trip 46. Specifically, the end of the latch 40 engages the associated smooth front edge of the rack 30 relieving the force of the latch lever 37 upon the trip 46. Accordingly the smooth front surface of the rack 30 restrains the latch lever 37 in its rotated position in the clockwise direction about the pivot pin 39; whereby the latch 41 is restrained in the aligned notch 43 formed in the latch plate 44.

Accordingly, at this time the primary carriage 16 is latched against further longitudinal movement and the rack 30 is free to slide with respect thereto; whereby the rack 30 is slid with respect to the primary carriage 16 effecting rotation of the gear 29 one step in the clockwise direction with the pivot pin 26. Thus the pin 26 is rotated one step in the clockwise direction causing the gear 25 to be rotated therewith in order to drive the meshing rack 24 one step toward the rear of the base plate 32. Specifically, the secondary carriage 9 is moved away from its normal lateral position one step in the lateral direction toward the rear of the base plate 32 with respect to the primary carriage 16; whereby the two wiper sets supported by the secondary carriage 9 are driven into engagement with the first contact strips in the contact units 72 previously selected by the longitudinal movement of the primary carriage 16. Thus the two wiper sets mentioned select the first two corresponding lines in the previously selected two groups of ten lines each. Thus it will be understood that by energizing the winding of the drive magnet 75A an additional number of times following the energization of the winding of the shift magnet 96A and the consequent operation of the latch lever 37, the secondary carriage 9 may be driven a corresponding number of steps toward the rear of the base plate 32. Hence, it will be understood that by energizing the winding of the drive magnet 75A the additional number of times mentioned the secondary carriage 9 is driven a corresponding number of steps away from its normal lateral position toward the rear of the base plate 32 in order to cause the two wiper sets to select two corresponding lines in the two previously selected groups of ten lines each. Thereafter one of the two lines thus selected may be selected by external relays, not shown, merely by selecting one of the two wiper sets mentioned.

Recapitulating, primary operation of the drive magnet 75A prior to operation of the shift magnet 96A effects primary operation of the primary carriage 16; while secondary operation of the drive magnet 75A subsequent to operation of the shift magnet 96A effects secondary operation of the secondary carriage 9. For example, in the event the drive magnet 75A is operated X number of times prior to operation of the shift magnet 96A, and is then operated Y number of times subsequent to operation of the shift magnet 96A, the primary carriage 16 is operated X steps in the longitudinal direction and the secondary carriage 9 is operated Y steps in the lateral direction; whereby the X longitudinal position and the Y lateral position set the two wiper sets carried by the secondary wiper carriage 9 to select the two corresponding lines in the two groups of 100 lines each.

In order to release the switching mechanism 100A, after operation thereof in the manner described above, the winding of the release magnet 105A is energized attracting and rotating the armature 106 in the counterclockwise direction about the pivot pin 107; whereby the release dog 109 is rotated in the clockwise direction about the screw 110 against the bias of the coil spring 109a. When the release dog 109 is thus operated, the fingers 111 and 112 respectively engage the detent 92 and the pawl 87 rotating the detent 92 in the counterclockwise direction about the screw 93 against the bias of the coil spring 94 and rotating the pawl 87 in the counterclockwise direction about the pivot pin 87a against the bias of the coil spring 88'. Accordingly, the detent 92 and the pawl 87 are moved out of engagement with the two corresponding teeth on the ratchet 88; whereby the ratchet 88 and the gear 85 are free to rotate upon the pin 85a. At this time the coil spring 89 restores the rack 30 toward the left causing the teeth on the left-hand end thereof to rotate the gear 29 in the counterclockwise direction; whereby the pin 26 carrying the gear 25 is thus rotated bringing about retraction of the rack 24. More particularly, the gear 25 rotating in the counterclockwise direction drives the rack 24 toward the front of the base plate 32; whereby the secondary carriage 9 is slid with respect to the primary carriage 16 back into its normal lateral position. When the secondary carriage 9 is thus restored to its normal lateral position, the rack 30 has moved toward the left by the coil spring 89 to bring the notch 42 formed therein into alignment with the latch 40 carried by the latch lever 37; whereby the leaf spring 38 rotates the latch lever 37 in the counterclockwise direction about the pivot pin 39 forcing the latch 40 into the notch 42. Accordingly, at this time the latch 41 carried by the latch lever 37 disengages the associated notch 43 formed in the latch plate 44; whereby the primary carriage 16 is latched to the rack 30 for movement therewith and is unlatched with respect to the base plate 32. Continued movement of the rack 30 toward the left by the coil spring 89 effects sliding of the primary carriage 16 toward the left along the guide rod 31. Accordingly, the rack 30 is restored toward the left back into its normal longitudinal position carrying the primary carriage 16 therewith; whereby the primary carriage 16 is restored toward the left back into its normal longitudinal position.

After the secondary carriage 9 and the primary carriage 16 have been released and restored back into the normal lateral position and the normal longitudinal positions thereof, respectively, the winding of the release magnet 105a is deenergized; whereby the armature 106 is released and rotated in the clockwise direction about the pivot pin 107 by the coil spring 109a incident to rotation of the release dog 109 in the counterclockwise direction, thereby about the pivot pin 110. At this time the fingers 111 and 112 carried by the release dog 109 disengage the detent 92 and a pawl 87, respectively; whereby the coil spring 94 rotates the detent 92 in the clockwise direction about the pivot pin 93 back into engagement with an associated tooth of the ratchet 88 and the coil spring 88' rotates the pawl 87 in the clockwise direction about the pivot pin 87a back into engagement with an associated tooth in the ratchet 88. At this time the switching mechanism 100A is completely released.

Further the switching mechanism 100A comprises the primary control contact structure 205 shown in Figs. 3 and 4 and including an insulating base plate 205a secured to the lower surface of the central portion of the apron 32b of the base plate 32 adjacent to the rear edge thereof by a pair of screws 206 extending through tapped openings formed in the apron 32b. Also the structure 205 comprises two insulating bushings 206a surrounding the screws 206 and a conducting guide rail 211 extending therebetween. The guide rail 211 is disposed below the insulating base plate 205a and carries longitudinally slidable wiper structure 208 including two individual wipers 209 and 210 and a connecting insulator 213. A band 212a is secured to the insulator 213 and surrounds the guide rail 211 and the wiper 210 is provided with two downwardly extending tabs 212 embracing the sides of the guide rail 211. Further, the insulating base 205a carries a series of ten longitudinally spaced apart contacts 207 cooperating with the wiper 209; the individual contacts 207 being spaced apart longitudinally distances corresponding to the respective steps of the primary carriage 16 in the longitudinal direction. Finally, the insulator 213 comprises two tabs 213a arranged in spaced apart relation and receiving a lug 214 secured to the lower surface of the bracket 200. The wiper structure 208 occupies a normal longitudinal position when the primary carriage 16 occupies its normal longitudinal position; and when the primary carriage 16 is moved step by step away from its normal longitudinal position toward the right, the wiper structure 208 is likewise moved away from its normal longitudinal position step by step toward the right. As noted above, the longitudinal spacings of the individual contacts 207 correspond to the steps of the primary carriage 16; whereby the wiper 209 engages a given individual contact 207 when the primary carriage 16 occupies its corresponding longitudinal stepped position. Finally, the wiper 210 engages the guide rail 211 at each step of the wiper structure 208. Thus it will be understood that the guide rail 211 may be selectively connected to the individual contacts 207 at the corresponding individual steps of the primary carriage 16; which arrangement may be employed for control and supervisory purposes in an obvious manner.

Also the switching mechanism 100A comprises a set of primary off-normal switch springs 47. The set of switch springs 47 is mounted upon a bracket 49 by suitable intervening insulating strips; which bracket 49 is suitably secured to the left-hand upper surface of the base plate 32. Also the switching mechanism 100A comprises a set of secondary off-normal switch springs 52. The set of switch springs 52 is mounted upon a bracket 50 by suitable intervening insulating strips; which bracket 50 is suitably secured to the left-hand upper surface of the base plate 32. The set of switch springs 47 is provided with an operating rod 48 slidably mounted in two aligned openings formed in the brackets 49 and 50 and carries an insulator 48a on the left-hand end thereof for operating the individual switch springs of the set 47. The right-hand end of the operating rod 48 engages a fixture 51 carried on the arm 34 of the primary carriage 16. Accordingly, when the primary carriage 16 is moved away from its normal longitudinal position one step toward the right, the fixture 51 disengages the right-hand end of the operating rod 48 causing the insulator 48a carried on the left-hand end of the operating rod 48 to operate the individual contacts of the set 47. A fixture 54 is secured to the left-hand upper surface of the base plate 32 and carries a pivot pin 54a upon which a bell-crank 53 is mounted. The bell-crank 53 is substantially L-shaped including one leg extending longitudinally toward the right and carrying a roller 65 and another leg extending forwardly and carrying a pivot pin 53a to which a link 56 is secured, the link 56 supporting an insulator 56a connected to the individual switch springs of the set 52. The roller 65 normally engages a fixture 55 secured to the secondary carriage 9. When the secondary carriage 9 is moved away from its normal lateral position one step toward the rear, the fixture 55 disengages the roller 65; whereby the bell-crank 53 is rotated in the counterclockwise direction about the pivot pin 54a causing the link 56 to operate through the insulator 56a, the individual switch springs of the set 52. Accordingly, the set of switch springs 47 is operated when the primary carriage 16 is operated from and back to its normal longitudinal position; and similarly, the set of switch springs 52 is operated when the secondary carriage 9 is operated from and back to its normal lateral position.

Further the switching apparatus 100A comprises a set of impulsing springs 58 mounted upon a bracket 59 by suitable intervening insulating strips; which bracket 59 is suitably secured to the left-hand upper surface of the base plate 32. The switch springs 58 are operated by an insulator 60a carried by a lever 60 mounted upon a pivot pin 61 and carrying a roller 62 on the outer end thereof that cooperates with a comb-like fixture 63 suitably secured to the arm 34 of the primary carriage 16. As the primary carriage 16 is moved from its normal longitudinal position toward the right, the teeth on the comb-like fixture 63 carried thereby engage and disengage the roller 62; whereby the lever 60 is pivoted first in the clockwise direction about the pivot pin 61 and then in the counterclockwise direction about the pivot pin 61; whereby the insulator 60a carried thereby operates the set of switch springs 58 to transmit a corresponding series of impulses.

Considering now the construction and arrangement of the contact bank 65 associated with the switching apparatus 100A in greater detail, it will be observed, as shown in Figs. 1, 1A, 5 and 6, that each of the four sections of the contact bank 65 comprises an assembly of ten individual contact units 72 retained in assembled relation by a plurality of bolts 73. Specifically each contact unit 72 comprises a centrally disposed insulating body 67 in the form of a flat strip having ten laterally spaced apart grooves formed in each surface thereof and carrying ten individual flat strip conductors 66 on each surface thereof arranged in the grooves mentioned. The strip conductors 66 disposed on each side of the insulating body 67 are retained in place in the grooves mentioned by a series of vertically spaced apart clamps 72A. Each of the clamps 72A comprises front and rear insulating sheets 68 and 69 overlying the respective surfaces of the strip conductors 66 arranged in the grooves mentioned formed in the respective front and rear surfaces of the insulating body 67, front and rear clamping plates 68a and 69a and two intervening spacing blocks 70. Finally, the elements of each clamp 17A are retained in assembled relation by two eyelets 71 respectively extending through the spacing blocks 70, as well as the adjacent ends of the clamping plates 68a and 69a and the adjacent ends of the insulating sheets 68 and 69. The eyelets 70 are of the hollow variety having an opening extending therethrough adapted to receive the clamping bolts 73 previously noted; whereby ten of the contact units 72 may be securely retained in stacked relation. The thickness of the insulating sheets 68 and 69 and the clamping plates 68a and 69a are such that the bodies 67 of each two adjacent contact units 72 are spaced longitudinally from each other a distance corresponding to one longitudinal step of the primary carriage 16 of the switching mechanism 100A so that when the ten assembled contact units 72 comprising a section in the contact bank 65 are supported by the associated supporting structure adjacent to the switching mechanism 100A that the contact strips 66 carried by the bodies 67 are spaced longitudinally corresponding to the various longitudinally stepped positions of the two associated main wipers carried by the secondary carriage 9. Also it is noted that the clamps 72A are spaced vertically apart in order to define a plurality of effective contact sections of each contact unit 72 therebetween that are, in turn, respectively accessible to the various wiper sets of the various switching mechanism 100A, etc., arranged in the vertical tier in the supporting structure. Accordingly, the sections of the contact strips covered by the clamps 72A constitute connecting multiples between the effective contact sections thereof that may be employed for marking purposes between the wiper sets of the various switching mechanisms having access thereto.

Recapitulating it is pointed out that the switching mechanisms 100A, etc., are carried by the supporting structure including the elements 401, 402, 403, 403, etc., in vertically stacked relation in what may be termed the Z direction. Likewise, the contact bank 65 extends vertically providing adjacent sections spaced apart substantially the fixed distance Z in the Z direction and accessible to the respective switching mechanisms. In each section of the contact bank 65, the ten individual contact units 72 are spaced longitudinally apart substantially the fixed distance X in the X direction and corresponding to the longitudinal steps of the primary carriages of the switching mechanisms 100A, etc. Further, the four sections of the contact bank 65 are spaced longitudinally apart corresponding to the distances between the various pairs of wipers in the two individual sets of switching mechanisms in the two wiper sets of the switching mechanisms 100A, etc. Finally, in each contact unit 72, the individual contact strips 66 are spaced apart laterally the substantially fixed distance Y in the Y direction corresponding to the lateral steps of the secondary carriages of the switching mechanisms 100A, etc.

Referring now more particularly to Figs. 1, 1B, 2, 2B, 7, 8 and 9, the switching apparatus there illustrated comprises the second form of the switching mechanism 100B of the direct drive type, the contact bank structure 65 and the supporting structure previously described. The details of the switching mechanism 100B, as shown in Figs. 1 and 2, are of course, identical to the corresponding details of the switching mechanism 100A previously described; likewise, the primary control contact structure 205 shown in Figs. 3 and 4 is incorporated in the switching mechanism 100B; and a plurality of the switching mechanisms 100B arranged in a vertical tier are commonly associated with the contact bank 65 of the construction and arrangement shown in Figs. 5 and 6. Accordingly, in the interest of brevity, the present description of the switching mechanism 100B will be confined primarily to the operating and release mechanisms therefor illustrated in Figs. 1B and 2B however, it will be understood that the elements shown in Figs. 1B and 2B are connected to the elements shown in Figs. 1 and 2 as previously noted.

The switching mechanism 100B comprises a drive magnet 75B, a shift magnet 96B and a release magnet 105B. The drive magnet 75B is provided with a bracket 113 suitably secured to the right-hand end of the base plate 32 and supporting a forwardly extending core 120 carrying the winding and cooperating with an oscillating armature 115 mounted upon a pivot pin 116 carried by the base plate 32. The shift magnet 96B and the release magnet 105B are provided with common magnetic structure 137 supporting the respective windings thereof and secured to the right-hand upper surface of the base plate 32. The shift magnet 96B is provided with an armature 148 pivotally mounted upon a screw 149 carried by the base plate 32; the armature 148 being provided with two legs 150 and 151. The outer end of the leg 150 is secured by a pin 100 to the slide 99 that, in turn, is connected by the pin 101 to the lever 102 supported by the screw 103 and carrying the trip 46 cooperating with the lug $37a$ formed on the latch lever 37. The release magnet 105B is provided with an armature 134 pivotally mounted upon a pivot pin 136 carried by the associated magnetic structure.

Further the base plate 32 carries an upstanding pin 124 upon which one end of a substantially L-shaped rocker 122 is pivoted, the other end of the rocker 122 being secured by a pivot pin 121 to one end of a toggle arm 119, the other end of the toggle arm 119 being secured by a pivot pin 118 to a toggle arm 117 rigidly secured to the pivot pin 116 to which the armature 115 is also rigidly secured. The rocker 122 is biased in the clockwise direction about the pivot pin 124 by a coil spring 125, one end of the coil spring 125 being secured to the end of the rocker 122 adjacent to the pivot pin 121 and the other end of the coil spring 125 being secured to a bracket 126 carried by the right-hand upper surface of the base plate 32. Also the bracket 126 carries a flexible spring stop 123, the front end of which is rigidly secured thereto and the rear end of which engages the pin 121 securing the rocker 122 to the toggle arm 119, the intermediate portion of the stop 123 being supported by a rigid arm $123a$ carried by the bracket 126. Also the rocker 122 is provided with a pivot pin 131 disposed adjacent to the pivot pin 121 and upon which a pawl arm 126 is pivotally mounted; the pawl arms 126 comprising two laterally spaced apart operating pawls 127 and 128. The pawl arm 126 is normally biased in the counterclockwise direction about the pivot pin 131 by a coil spring 133, one end of the coil spring 133 being secured to the pawl arm 126 and the other end of the coil spring 133 being secured to the rocker 122. Also the pawl arm 126 is secured by a coil spring 132 to the armature 134 of the release magnet 105B for a purpose more fully explained hereinafter.

Finally, the base plate 32 carries a bracket 141 in which the upper end of a pin 139 is journaled, the lower end of the pin 139 being journaled directly in the base plate 32. The pin 139 has two ratchets 129 and 130, a positioning cam 140 and a gear 142 rigidly secured thereto; the positioning cam 140 being disposed above the ratchet 129, the ratchet 129 being disposed above the ratchet 130 and the ratchet 130 being disposed above the gear 142. The ratchet 129 is adapted to cooperate with the pawl 127 carried by the pawl arm 126 in order to drive the pin 139 step by step in the counterclockwise direction, while the ratchet 130 is adapted to cooperate with the pawl 128 carried by the pawl arm 126 in order to drive the pin 139 step by step in the clockwise direction. The pawl 127 normally cooperates with the ratchet 129 and the pawl 128 is normally disassociated from the ratchet 130 when the armature 134 of the release magnet 105B occupies its restored position. On the other hand, the pawl 128 is moved into cooperating relation with the ratchet 130 and the pawl 127 is disassociated from the ratchet 129 when the armature 134 of the release magnet 105B occupies its operated position, as explained more fully hereinafter. Further, a positioning lever 145 is pivotally mounted upon a pin 146 carried by the base plate 32, the outer end of the positioning lever 145 carrying a roller 144 urged into engagement with one of ten cam sections 143 provided in the edge of the positioning cam 140 by a coil spring 147 extending between the positioning lever 145 and an upstanding pin 147a carried by the base plate 32. Finally, the teeth on the gear 142 mesh with the teeth 30a formed on the rear edge of the rack 30.

Considering now the operation of the switching mechanism 100B, the rack 30 normally occupies its normal longitudinal position toward the left; whereby the primary carriage 16 occupies its normal longitudinal position toward the left and the secondary carriage 9 occupies its normal lateral position toward the front. The winding of the drive magnet 75B is energized and deenergized a primary number of times prior to energization of the winding of the shift magnet 96B and while the latch 40 latches the latching arm 37 to the rack 30 in order to latch the primary carriage 16 to the rack 30. Each time the winding of the operating magnet 75B is energized and then deenergized the associated armature 115 is rotated from one of its extreme positions to the other rotating the pin 116 therewith and executing movement of the toggle arms 117 and 119 from one position through the center portion to the other position thereof. First assuming that the armature 115 occupies the position illustrated, when the winding of the operating magnet 75B is energized and then deenergized, the armature 115 is attracted by the core 120 and rotated in the counterclockwise direction with the pivot pin 116 from the full position illustrated to the dotted position illustrated. As the pin 116 is thus rotated in the counterclockwise direction, the toggle arms 117 and 119 are moved from the full position illustrated through the center portion to the dotted position illustrated. As the toggle arms 117 and 119 are moved from the full position toward the center position the coil spring 125 is tensioned; and when the toggle arms 117 and 119 move through the center position, the coil spring 125 snaps them to the dotted position. Accordingly, as the toggle arms 117 and 119 are moved from the full position through the center position to the dotted position, the rocker 122 is first rotated in the counterclockwise direction about the pivot pin 124 against the bias of the coil spring 125 and then rotated back in the clockwise direction about the pivot pin 124 by the coil spring 125. Hence, the pawl arm 126 is advanced toward the left and then retracted toward the right; whereby the pawl 127 operatively associated with the ratchet 129 engages a tooth on the ratchet 129 rotating it and the pin 139 one step in the counterclockwise direction. As the pin 139 is thus rotated, the positioning cam 140 is rotated therewith; whereby the roller 144 carried on the outer end of the positioning lever 145 rides out of one of the camming surfaces 143 provided in the edge of the positioning cam 140 and into the adjacent camming surface 143; whereby the stepped rotated position of the pin 139 is accurately located precisely one step. As the pin 139 is thus rotated one step in the counterclockwise direction, the gear 142 is rotated therewith effecting sliding of the rack 30 away from its normal lateral position one step toward the right; whereby the primary carriage 16 is moved from its normal longitudinal position one step toward the right.

When the winding of the drive magnet 75B is subsequently energized and then deenergized, the armature 115 is rotated from the dotted position back to the full position; whereby the toggle arms 117 and 119 are moved from the dotted position back into the full position causing the rocker 122 again to be rotated in the counterclockwise direction about the pivot pin 124 and then restored in the clockwise direction about the pivot pin 124; whereby the pawl 127 again drives the ratchet 129 another step in the counterclockwise direction effecting another step of longitudinal movement of the rack 30 and the primary carriage 16.

After the primary operation of the driving magnet 75B the winding of the shift magnet 96B is energized attracting and rotating the armature 148 in the counterclockwise direction about the screw 149 in order to operate the slide 99 causing the trip 46 to operate the latching lever 37; whereby the latch 40 disengages the notch 42 formed in the rack 30 and the latch 41 engages the aligned notch 43 formed in the latch plate 44; whereby the primary carriage 16 is unlatched from the rack 30 and is latched by the latching plate 44 against further longitudinal movement; all in the manner described in conjunction with the operation of the switching mechanism 100A.

At this time while the winding of the shift magnet 96B is energized, the winding of the operating magnet 75B is energized and then deenergized the first of a number of secondary times effecting movement of the rack 30 an additional step toward the right; whereby the notch 42 formed in the rack 30 is moved out of alignment with the latch 40 carried on the latch lever 37 and the smooth front edge of the rack 30 restrains the latch 41 in the aligned notch 43 formed in the latching plate 44 in the manner previously explained in connection with the operation of the switching mechanism 100A. At this time the winding of the shift magnet 96B may be deenergized. The rack 30 is slid with respect to the primary carriage 16 effecting movement of the secondary carriage 9 away from its normal lateral position one step in the lateral direction toward the rear of the base plate 32 with respect to the primary carriage 16 by virtue of the operation of the gears 29 and 25 meshing respectively with the teeth provided on the left-hand end of the rack 30 and the teeth provided on the rack 24; whereby the two wiper sets supported by the secondary carriage 9 are driven into engagement with the first contact strips in the contact units 72 previously selected by the longitudinal movement of the primary carriage 16. Thus the two wiper sets mentioned select the first two corresponding lines in the previously selected two groups of ten lines each. Hence, it will be understood that by energizing and then deenergizing the winding of the drive magnet 75B the secondary number of times mentioned, the secondary carriage 9 is driven a corresponding number of steps away from its normal lateral position toward the rear of the base plate 32 in order to cause the two wiper sets to select two corresponding lines in the two previously selected groups of ten lines each. Thereafter, one of the two lines thus selected may be selected by external relays, not shown, merely by selecting one of the two wiper sets mentioned.

Recapitulating, primary operation of the drive magnet 75B prior to operation of the shift magnet 96B effects primary operation of the primary carriage 16; while secondary operation of the drive magnet 75B subsequent to operation of the shift magnet 96B effects secondary operation of the secondary carriage 9. For example, in the event the drive magnet 75B is operated X number of times prior to operation of the shift magnet 96B, and is then operated Y number of times subsequent to operation of the shift magnet 96B, the primary carriage 16 is operated X steps in the longitudinal direction and the secondary carriage 9 is operated Y steps in the lateral direction; whereby the X longitudinal position and the Y lateral position set the two wiper sets carried by the secondary wiper carriage 9 to select the two corresponding lines in the two groups of 100 lines each.

In order to release the switching mechanism 100B, after operation thereof in the manner described above, the winding of the release magnet 105B is energized attracting and rotating the armature 134 in the clockwise direction about the pivot pin 136; whereby the pawl arm 126 is rotated in the clockwise direction about the pivot pin 131 by the coil spring 132 extending between the armature 134 and the pawl arm 126 against the bias of the coil spring 133 extending between the pawl arm 126 and the rocker 122. When the pawl arm 126 is thus operated, the pawl 127 carried thereby is disassociated from the ratchet 129 and the pawl 128 carried thereby is associated with the ratchet 130. At this time the winding of the drive magnet 75B is energized and deenergized a number of times; whereby the armature 115 effects operation of the toggle arms 119 and 117 and the consequent operation of the rocker 122 and the pawl arm 126 in the manner previously explained. At this time each time the pawl arm 126 is advanced toward the left, the pawl 128 engages a tooth on the ratchet 130 rotating the ratchet 130 one step in the clockwise direction; whereby the pin 139 is rotated effecting rotation of the positioning cam 140, the gear 142, as well as the ratchet 129, one step in the clockwise direction. As the pin 139 is thus rotated, the roller 144 carried on the outer end of the positioning lever 145 rides out of one of the camming surfaces 143 provided in the edge of the positioning cam 140 and into the adjacent camming surface 143; whereby the stepped rotated position of the pin 139 is accurately located precisely one step. As the gear 142 is rotated with the pin 139 one step in the clockwise direction, the rack 30 is slid one step in the longitudinal direction toward the left; which movement of the rack 30 retracts the secondary carriage 9 one step in the lateral direction toward the front due to the cooperation between the gears 25 and 29, the teeth on the rack 24 and the teeth on the rack 30. In passing it is noted that in the switching mechanism 100B while the rack 30 has a normal longitudinal position toward the left it is not biased thereto by a coil spring as is the corresponding rack 30 in the switching mechanism 100A. Accordingly, at this time the drive magnet 75B is energized and deenergized a number of times while the winding of the release magnet 105B is energized in order to cause the rack 30 to be moved a corresponding number of steps toward the left back towards its normal longitudinal position; whereby the secondary carriage 9 is retracted toward the front into its normal lateral position. At this time the notch 42 formed in the front edge of the rack 30 is moved into alignment with the latch 40; whereby the leaf spring 38 rotates the latch lever 37 in the counterclockwise direction about the pivot pin 39 moving the latch 40 into the notch 42 formed in the rack 30 and moving the latch 41 out of the aligned notch 43 formed in the latching plate 44. At this time the primary carriage 16 is latched to the rack 30 and is unlatched with respect to the latching plate 44. Energization and deenergization of the winding of the drive magnet 75B is continued while the winding of the release magnet 105B is energized; whereby further longitudinal movement toward the left is imparted to the rack 30 driving it back into its normal longitudinal position; whereby the primary carriage 16 is moved therewith back into its normal longitudinal position. At this time, further operation of the driving magnet 75B is arrested and the winding of the release magnet 105B is deenergized releasing the armature 134 and consequently the pawl arm 126 through the coil spring 132 extending between the armature 134 and the pawl arm 126. The coil spring 133 extending between the pawl arm 126 and the rocker 122 rotates the pawl arm 126 in the counterclockwise direction about the pivot pin 131; whereby the pawl 128 is disassociated from the ratchet 130 and the pawl 127 is associated with the ratchet 129. At this time the switching mechanism 100B is completely released.

Further, the switching mechanism 100B comprises the primary control contact structure 205 shown in Figs. 3 and 4 as previously noted, as well as a set of shift control switch springs 152. The set of switch springs 152 is mounted upon a bracket 152*a* by suitably intervening insulating strips; which bracket 152 is suitably secured to the right-hand upper surface of the base plate 32. The set of switch springs 152 is operated by an insulator 151*a* carried on the outer end of the arm 151 provided on the armature 148 as previously noted. Accordingly, when the winding of the shift magnet 96B is energized the armature 148 is attracted and rotated in the counterclockwise direction about the screw 149 causing the insulator 151*a* to operate the set of switch springs 152. Thus the set of switch springs 152 is operated when the armature 148 is operated and subsequently restored.

Further, the switching mechanism 100B comprises a set of impulsing springs 122*a* mounted upon a bracket 122*b* by suitable intervening insulating strips; which bracket 122*b* is suitably secured to the right-hand upper surface of the base plate 32. The switch springs 122*a* are operated by an insulator 122*c* secured to the rocker 122. Accordingly, each time the winding of the drive magnet 75B is energized and then deenergized, the armature 115 effects operation of the rocker 122 in the manner previously explained; whereby the insulator 122*c* operates and then restores the set of switch springs 122*a*.

The relationship between the switching mechanisms 100B, etc., carried by the supporting structure in vertically stacked relation with respect to the associated contact bank 65 is the same as that previously described in connection with the switching mechanisms 100A, etc.

Referring now more particularly to Figs. 1, 1C, 2 and 2C, the switching apparatus there illustrated comprises the third form of the switching mechanism 100C of the escapement drive type, the contact bank structure 65 and the supporting structure previously described. The details of the switching mechanism 100C as shown in Figs. 1 and 2, are of course, identical to the corresponding details of the switching mechanism 100A previously described; likewise, the primary control contact structure 205 shown in Figs. 3 and 4 is incorporated in the switching mechanism 100C; and a plurality of the switching mechanisms 100C arranged in a vertical tier are commonly associated with the contact bank 65 of the construction and arrangement shown in Figs. 5 and 6. Accordingly, in the interest of brevity the present description of the switching mechanism 100C will be confined primarily to the operation and release mechanisms therefor illustrated in Figs. 1C and 2C; however, it will be understood that the elements shown in Figs. 1C and 2C are connected to the elements shown in Figs. 1 and 2 as previously noted.

The switching mechanism 100C comprises a drive magnet 75C, a shift magnet 96C and a release magnet 105C provided with common magnetic structure 161 secured to the upper surface of the right-hand end of the base plate 32. The drive magnet 75C is provided with a heel piece 163a carrying a pivot pin 163 upon which an armature 162 is pivotally mounted. The outer end of the armature 162 carries a pivot pin 168a upon which a pawl 168 is mounted, the pawl 168 cooperating with teeth formed on the rear edge of the right-hand end of the rack 30 and constituting a ratchet 30a. The pawl 168 is biased in the counterclockwise direction about the pivot pin 168a by a coil spring 191 extending between the pawl 168 and the armature 162. The armature 162 is biased in the counterclockwise direction about the pivot pin 163 by a coil spring 162a extending between the armature 162 and a pin 176a carried by the upper surface of the base plate 32. Also an upstanding post 176b is secured to the upper surface of the base plate 32 and is provided with a tapped opening therein receiving a threaded stop 176c engaging the adjacent outer end of the armature 162 in order to establish the stroke thereof. The shift magnet 96C is provided with an armature 181 pivotally mounted upon a screw 188 carried by the base plate 32; the armature 181 being provided with two legs 182 and 183. The outer end of the leg 182 is secured by the pin 100 to the slide 99 that, in turn, is connected by the pin 101 to the lever 102 supported by the screw 103 and carrying the trip 46 cooperating with the lug 37a formed on the latch lever 37.

The release magnet 105C is provided with an armature 165 pivotally mounted upon a pivot pin 165a carried by the associated magnetic structure 161. Also the base plate 32 carries a bracket 169a supporting a detent 169 that also engages the teeth of the ratchet 30a formed on the rack 30. Also a substantially U-shaped element 167 is pivotally mounted upon a screw 167a carried by the base plate 32 and provided with front and rear arms 167b and 167c. The rear arm 167c is connected by a pin 166a to a link 166 that, in turn, is connected by a pin 165b to the armature 165 of the release magnet 105C. When the armature 165 of the release magnet 105C occupies its restored position rotated in a counterclockwise direction about the pivot pin 165a, the element 167 is rotated in the clockwise direction about the screw 167a by the link 166; whereby the arm 167b is disposed forwardly with respect to the pawl 168 and the detent 169. However, the arm 167b is disposed in cooperating relation with respect to the pawl 168 and the detent 169 and is arranged when the element 167 is rotated in the counterclockwise direction about the screw 167a to engage the pawl 168 and the detent 169 moving them from engagement with two associated teeth on the ratchet 30a carried by the rack 30.

Further the base plate 32 carries two laterally spaced apart brackets 174 on the right-hand upper surface thereof upon which a substantially U-shaped fixture 172 is pivotally mounted upon two oppositely directed pivot pins 173. The fixture 172 is normally restrained in a clockwise direction about the pivot pins 173 by a coil spring 173' extending between the fixture 172 and a fixture 173a suitably secured to the right-hand upper surface of the base plate 32. Further the fixture 173a carries an upper longitudinally extending detent 176 and a lower longitudinally extending detent 177 arranged in cooperating relation with respect to a plurality of longitudinally spaced apart openings 178 formed in the right-hand end of the rack 30. More particularly, the rack 30 has a normal longitudinal position toward the left and is biased toward the right by a coil spring 179 extending between a fixture, not shown, carried by the rack 30 and a fixture, not shown, carried by the upper right-hand end of the base plate 32. When the rack 30 occupies its normal longitudinal position, the extreme outer end of the lower detent 177 projects into an associated one of the openings 178 formed in the right-hand end of the rack 30 and the extreme outer end of the upper detent 176 engages a portion of the rack 30 disposed between two of the openings 178 formed therein. Further, the fixture 172 carries an arm 175 that is arranged between two forwardly projecting arms 176a and 177a respectively carried by the upper detent 176 and by the lower detent 177; which arrangement is utilized for a purpose more fully explained hereinafter. Finally, the fixture 172 carries a lug 171 that is adapted to cooperate with a lug 170 carried by the pawl 168 as explained more fully hereinafter.

Considering now the operation of the switching mechanism 100C, the rack 30 normally occupies its normal longitudinal position toward the left; whereby the primary carriage 16 occupies its normal longitudinal position toward the left and the secondary carriage 9 occupies its normal lateral position toward the front. The winding of the release magnet 105C is first energized attracting and rotating the armature 165 in the clockwise direction about the pivot pin 165a; whereby the link 166 rotates the fixture 167 in the counterclockwise direction about the screw 167a. When the fixture 167 is thus operated the arm 167b thereof engages the pawl 168 and the detent 169 moving them out of engagement with the two associated teeth on the ratchet 30a formed on the rack 30. More particularly, the pawl 168 is rotated in the clockwise direction about the pivot pin 168a against the bias of the coil spring 191; whereby the lug 170 carried by the pawl 168 is brought into alignment with respect to the lug 171 carried by the fixture 172. At this time the winding of the drive magnet 75C is energized attracting and rotating the armature 162 in the clockwise direction about the pivot pin 163 against the bias of the coil spring 162a; whereby the pawl 168 being disassociated from the ratchet 30a provided on the rack 30 is not effective to move the rack 30; however, the lug 170 carried by the pawl 168 engages the lug 171 carried by the fixture 172. Accordingly, the fixture 172 is rotated in the counterclockwise direction about the pivot pins 173 against the bias of the coil spring 173' causing the arm 175 to engage the arm 177a carried by the detent 177 in order to force the detent 177 out of the associated opening 178 formed in the rack 30. Also when the fixture 172 is rotated in the counterclockwise direction about the pivot pins 173, the arm 175 disengages the arm 176a carried by the detent 176 unblocking movement of the detent 176 toward the rack 30. When the lower detent 177 disengages the associated opening 178 formed in the rack 30, the coil spring 179 slides the rack 30 toward the right; whereby the upper detent 176 enters the associated opening 178 formed in the rack 30. At this time the winding of the driving magnet 75C is deenergized; whereby the armature 162 is released and rotated in the counterclockwise direction about the pivot pin 163 by the coil spring 162a in order to cause the lug 170 carried by the pawl 168 to disengage the lug 171 carried by the fixture 172. Accordingly, the fixture 172 is rotated in the clockwise direction about the pivot pins 173 by the coil spring 173'. When the fixture 172 is thus operated the arm 175 thereof disengages the arm 177a carried by the lower detent 177 permitting the detent 177 to enter the associated opening 178 formed in the rack 30. Also the arm 175 carried by the fixture 172 engages the arm 176a carried by the upper detent 176 in order to move the upper detent 176 from the associated opening 178 formed in the rack 30. At this time the coil spring 179 effects any necessary adjustment of the rack 30 toward the right in order to complete the full first step thereof. Accordingly, when the winding of the drive magnet 75C is energized and then deenergized while the winding of the release magnet 105C is energized the rack 30 is moved by the coil spring 179 from its normal longitudinal position one step toward the right as a consequence of the operation of the escapement arrangement, including the upper and lower detents 176 and 177 cooperating with the openings 178 formed in the rack 30, and of the movements of the fixture 172 by the pawl 168 incident to the operation and subsequent restoration of the armature 162.

At this time the winding of the drive magnet 75C is energized and deenergized as explained above a primary number of times while the winding of the release magnet 105C is energized and while the latch 40 latches the latching arm 37 to the rack 30 in order to latch the primary carriage 16 to the rack 30; whereby the primary carriage 16 is moved from its normal longitudinal position a corresponding number of steps toward the right. After the primary carriage 16 has been operated as described above the required number of steps away from its normal longitudinal position, the winding of the shift magnet 96C is energized; whereby the armature 181 is attracted and rotated in the counterclockwise direction about the screw 183 moving the slide 99 toward the front of the base plate 32 and causing the trip 46 to move the latch 40 out of the notch 42 formed in the front edge of the rack 30 and into the aligned notch 43 formed in the latching plate 44; all in the manner described in connection with the operation of the mechanism 100A. At this time the primary carriage 16 is unlatched from the rack 30 and is latched against further longitudinal movement to the latching plate 44.

At this time while the winding of the shift magnet 96C and the winding of the release magnet 105C are energized, the winding of the drive magnet 75C is energized and then deenergized in order to permit the escapement mechanism to move the rack 30 an additional step in the longitudinal direction toward the right. At this time the notch 42 formed in the front edge of the rack 30 is moved out of alignment with the latch 40 carried by the latching lever 37; whereby the latching lever 37 is restrained in its operated position against the bias of the leaf spring 38 by the smooth front surface of the rack 30; whereupon the winding of the shift magnet 96C may be deenergized. Thereafter, while the winding of the release magnet 105C is energized, the winding of the drive magnet 75C is energized and then deenergized the required number of times in order to complete the required number of additional operations thereof following energization of the winding of the shift magnet 96C; whereby the additional steps imparted by the coil spring 179 to the rack 30 cause the secondary carriage 9 to be projected from its normal lateral position toward the rear a corresponding number of steps by virtue of the operation of the drive mechanism including the gears 29 and 25 respectively meshing the teeth provided on the left-hand end of the rack 30 and the teeth provided on the rack 24. At this time the winding of the release magnet 105C may be deenergized releasing the armature 165; whereby the armature 165 is rotated in the counterclockwise direction about the pivot pin 165a through the link 166 as a consequence of rotation of the fixture 167 in the clockwise direction about the screw 167a due to the resiliency of the detent 169 and the bias of the pawl 168 toward the ratchet 30a provided on the right-hand end of the rack 30. More particularly, the arm 167b of the fixture 168 disengages the pawl 168 and the detent 169; whereby the pawl 168 and the detent 169 reengage the teeth on the ratchet 30a provided on the right-hand end of the rack 30.

Recapitulating, a primary operation of the drive magnet 75C while the release magnet 105C is operated and prior to operation of the shift magnet 96C effects primary escapement of the rack 30 and the consequent primary operation of the primary carriage 16; while secondary operation of the drive magnet 75C while the release magnet 105C is operated and subsequent to operation of the shift magnet 96C effects secondary escapement of the rack 13 and the consequent secondary operation of the secondary carriage 9. For example, in the event the drive magnet 75C is operated X number of times while the release magnet 105C is operated and prior to operation of the shift magnet 96C and is then operated Y number of times while the release magnet 105C is operated and subsequent to operation of the shift magnet 96C, the primary carriage 16 is operated X steps in the longitudinal direction and the secondary carriage 9 is operated Y steps in the lateral direction; whereby the X longitudinal position and the Y lateral position set the two wiper sets carried by the secondary wiper carriage 9 to select the two corresponding lines in the two groups of 100 lines each. Thereafter, one of the two lines thus selected may be selected by external relays, not shown, merely by selecting one of the two wiper sets mentioned.

In order to release the switching mechanism 100C after operation thereof in the manner described above, the winding of the drive magnet 75C is energized and deenergized the required number of times while the release magnet 105C occupies its restored position. Each time the drive magnet 75C is thus operated the armature 162 is operated in order to effect operation of the pawl 168 in the manner previously explained. At this time the lug 170 carried by the pawl 168 is moved out of cooperating relation with the lug 171 carried by the fixture 172 since the pawl 168 occupies its normal position rotated in the counterclockwise direction about the pivot pin 168a by the coil spring 191; whereby operation of the pawl 168 does not effect operation of the fixture 172 at this time; however, each time the pawl 168 is operated, the ratchet 30a carried on the right-hand end of the rack 30 is operated and restrained in its operated position by the detent 169; whereby the rack 30 is slid step by step in the longitudinal direction toward the left back into its normal longitudinal position against the bias of the coil spring 179. The initial movement of the rack 30 toward the left effects retraction of the secondary carriage 9 back into its normal lateral position; whereupon the notch 42 formed in the front edge of the rack 30 is moved into alignment with the latch 40. At this time the latching lever 37 is rotated in the counterclockwise direction about the pivot pin 39 by the leaf spring 38 causing the latch 40 to enter the notch 42 formed in the front edge of the rack 30 and causing the latch 41 to disengage the notch 43 formed in the latching plate 44. Continued movement of the rack 30 toward the left effects movement of the primary carriage 16 toward the left back into its normal longitudinal position. At this time the switching mechanism 100C is completely released.

Further the switching mechanism 100C comprises the primary control contact structure 205 shown in Figs. 3 and 4 as previously noted, as well as a set of shift control switch springs 187. The set of switch springs 187 is mounted upon a bracket 187a by suitably intervening insulating strips; which bracket 187a is suitably secured to the right-hand upper surface of the base plate 32. The set of switch springs 187 is operated by an insulator 183a carried on the outer end of the arm 183 provided on the armature 181 as previously noted. Accordingly, when the winding of the shift magnet 96C is energized, the armature 181 is attracted and rotated in the counterclockwise direction about the screw 188 causing the insulator 183a to operate the set of switch springs 187. Thus the set of switch springs 187 is operated when the armature 181 is operated and subsequently restored.

Further the switching mechanism 100C comprises a set of impulsing springs 188′ mounted upon a bracket 188a by suitable intervening insulating strips; which bracket 188a is suitably secured to the right-hand upper surface of the base plate 32. The switch springs 188′ are operated by an insulator 188b secured to the armature 162. Accordingly, each time the winding of the driving magnet 75C is energized and then deenergized, the armature 162 operates and then restores the set of switch springs 188′ through the insulator 188b.

The relationship between the switching mechanisms 100C, etc., carried by the supporting structure in vertically stacked relation with respect to the associated contact bank 65 is the same as that previously described in connection with the switching mechanisms 100A, etc.

In view of the foregoing, it is apparent that there has been provided in automatic switching apparatus of the type including primary and secondary carriages, improved mechanism for selectively operating the primary and secondary carriages and for restoring the secondary and primary carriages. The modified construction of the switching apparatus illustrated in Figs. 1, 1A, 2, 2A, 3, 4, 5 and 6 is claimed in a copending divisional application Serial No. 161,780, filed May 13, 1950, and the modified construction of the switching apparatus illustrated in Figs. 1, 1C, 2, 2C, 3, 4, 5 and 6 is claimed in a copending divisional application Serial No. 171,016, filed June 29, 1950.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a drive motor, first transmission mechanism, means including said drive motor and said first transmission mechanism for selectively and directly operating said primary carriage away from said normal primary position, shift means operated to restrain said primary carriage against further operation by said first transmission mechanism, means thereafter operated by said drive motor and said first transmission mechanism for selectively and directly operating said secondary carriage away from said normal secondary position, second transmission mechanism, and means including said drive motor and said second transmission mechanism for directly restoring said secondary carriage to said normal secondary position and then for directly restoring said primary carriage to said normal primary position.

2. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, first transmission mechanism operative selectively to operate said primary carriage away from said normal primary position, shift means thereafter operative to restrain said primary carriage against further operation by said first transmission mechanism, means thereafter operative selectively by said first transmission mechanism to operate said secondary carriage away from said normal secondary position, second transmission mechanism operative to restore said secondary carriage to said normal secondary position and then to restore said primary carriage to said normal primary position, a drive motor, and means for selectively directly operatively associating said drive motor with said first and second transmission mechanisms.

2. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a first pawl and ratchet mechanism operative selectively to operate said primary carriage step by step away from said normal primary position, shift means thereafter operative to restrain said primary carriage against further operation by said first pawl and ratchet mechanism, means thereafter operative selectively by said first pawl and ratchet mechanism to operate said secondary carriage step by step away from said normal secondary position, a second pawl and ratchet mechanism operative to restore said secondary carriage step by step back into said normal secondary position and then to restore said primary carriage step by step back into said normal primary position, a drive magnet, and means for selectively directly operatively associating said drive magnet with said first and second pawl and ratchet mechanisms.

4. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a first pawl and ratchet mechanism operative selectively to operate said primary carriage step by step away from said normal primary position, shift means thereafter operative to restrain said primary carriage against further operation by said first pawl and ratchet mechanism, means thereafter operative selectively by said first pawl and ratchet mechanism to operate said secondary carriage step by step away from said normal secondary position, a second pawl and ratchet mechanism operative to restore said secondary carriage step by step back into said normal secondary position and then to restore said primary carriage step by step back into said normal primary position, a drive magnet normally directly operatively associated with said first pawl and ratchet mechanism, and means including a release magnet for operatively disassociating said drive magnet from said first pawl and ratchet mechanism and for directly operatively associating said drive magnet with said second pawl and ratchet mechanism.

5. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a drive bar carried by said support and having a normal position and mounted for movement with respect thereto, a drive motor, first transmission mechanism, means including said drive motor and said first transmission mechanism for directing imparting to said drive bar selective movements in a given direction away from its normal position, second transmission mechanism, means including said drive motor and said second transmission mechanism for directly imparting to said drive bar movement in the opposite direction back into its normal position, control means having a normal position in which it is responsive to initial movement in said given direction of said drive bar for correspondingly operating said primary carriage away from said normal primary position and responsive to continued movement in said opposite direction of said drive bar for correspondingly restoring said primary carriage to said normal primary position and an operated position in which it is responsive to continued movement in said given direction of said drive bar for correspondingly operating said secondary carriage away from said normal secondary position and responsive to initial movement in said opposite direction of said drive bar for correspondingly restoring said secondary carriage to said normal secondary position, and means for selectively moving said control means between its normal position and its operated position.

6. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a drive bar carried by said support and having a normal position and mounted for movement with respect thereto, first transmission mechanism operative to impart to said drive bar selective movements in a given direction away from its normal position, second transmission mechanism operative to impart to said drive bar movement in the opposite direction back into its normal position, a drive motor, means for selectively directly operatively associating said drive motor with said first and second transmission mechanisms, control means having a normal position in which it is responsive to initial movement in said given direction of said drive bar for correspondingly operating said primary carriage away from said normal primary position and responsive to continued movement in said opposite direction of said drive bar for correspondingly restoring said primary carriage to said normal primary position and an operated position in which it is responsive to continued movement in said given direction of said drive bar for correspondingly operating said secondary carriage away from said normal secondary position and responsive to initial movement in said opposite direction of said drive bar for correspondingly restoring said secondary carriage to said normal secondary position, and means for selectively moving said control means between its normal position and its operated position.

7. Switching apparatus comprising a support, a primary carriage carried by said support and having a normal primary position and mounted for primary movement upon said support with respect to said normal primary position, a secondary carriage carried by said primary carriage and having a normal secondary position and mounted for secondary movement upon said primary carriage with respect to said normal secondary position, a contact controlling element carried by said secondary carriage, a drive bar carried by said support and having a normal position and mounted for movement with respect thereto, first transmission mechanism operative to impart to said drive bar selective movements in a given direction away from its normal position, second transmission mechanism operative to impart to said drive bar movement in the opposite direction back into its normal position, a drive magnet, means including a release magnet for selectively directly operatively associating said drive magnet with said first and second transmission mechanisms, control means having a normal position in which it is responsive to initial movement in said given direction of said drive bar for correspondingly operating said primary carriage away from said normal primary position and responsive to continued movement in said opposite direction of said drive bar for correspondingly restoring said primary carriage to said normal primary position and an operated position in which it is responsive to continued movement in said given direction of said drive bar for correspondingly operating said secondary carriage away from said normal secondary position and responsive to initial movement in said opposite direction of said drive bar for correspondingly restoring said secondary carriage to said normal secondary position, and means including a shift magnet for selectively moving said control means between its normal position and its operated position.

8. Switching apparatus comprising a support, switching mechanism carried by said support and mounted for movements with respect thereto, a drive bar carried by said support and mounted for movements in first and second opposed directions with respect thereto, means responsive to the movements of said drive bar for selectively moving said switching mechanism, a first ratchet operative to move said drive bar step by step in said first direction, a second ratchet operative to move said drive bar step by step in said second direction, a pawl arm carrying first and second pawls and having first and second positions, said first and second pawls being respectively associated with said first ratchet and disassociated from said second ratchet when said pawl arm occupies its first position and being respectively disassociated from said first ratchet and associated with said second ratchet when said pawl arm occupies its second position, means for selectively moving said pawl arm between its first and second positions, and means including a drive magnet for operating said pawl arm in order to cause one of said pawls to operate the associated one of said ratchets.

9. Switching apparatus comprising a support, switching mechanism carried by said support and mounted for movements with respect thereto, a drive bar carried by said support and mounted for movements in first and second opposed directions with respect thereto, means responsive to the movements of the drive bar for selectively moving said switching mechanism, a first ratchet operative to move said drive bar step by step in said first direction, a second ratchet operative to move said drive bar step by step in said second direction, a pawl arm carrying first and second pawls and having first and second positions, said first and second pawls being respectively associated with said first ratchet and disassociated from said second ratchet when said pawl arm occupies its first position and being respectively disassociated from said first ratchet and associated with said second ratchet when said pawl arm occupies its second position, means for selectively moving said pawl arm between its first and second positions, a toggle link having first and second and center positions and being movable from its first position through its center position to its second position and from its second position through its center position to its first position, means responsive to operation of said toggle link from either of its positions through its center position to the other of its positions for operating said pawl arm in order to cause one of said pawls to operate the associated one of said ratchets, and means for operating said toggle link from either of its positions through its center position to the other of its positions.

10. Switching apparatus comprising a support, switching mechanism carried by said support and mounted for movements with respect thereto, a drive bar carried by said support and mounted for movements in first and second opposed directions with respect thereto, means responsive to the movements of said drive bar for selectively moving said switching mechanism, a first ratchet operative to move said drive bar step by step in said first direction, a second ratchet operative to move said drive bar step by step in said second direction, a pawl arm carrying first and second pawls and having first and second positions, said first and second pawls being respectively associated with said first ratchet and disassociated from said second ratchet when said pawl arm occupies its first position and being respectively disassociated from said first ratchet and associated with said second ratchet when said pawl arm occupies its second position, means for selectively moving said pawl arm between its first and second positions, a toggle link having first and second and center positions and being movable from its first position through its center position to its second position and from its second position through its center position to its first position, means responsive to operation of said toggle link from either of its positions through its center position to the other of its positions for operating said pawl arm in order to cause one of said pawls to operate the associated one of said ratchets, a drive magnet provided with a winding and an armature having two positions, means responsive to each energization and subsequent deenergization of said winding for moving said armature from one of its positions to the other, and means responsive to movement of said armature from one of its positions to the other for operating said toggle link from either of its positions through its center position to the other of its positions.

HANS SENGEBUSCH.

REFERENCES CITED

The following references are of record in the file of this patent:

UNITED STATES PATENTS

| Number | Name | Date |
|---|---|---|
| 1,251,795 | McGrath | Jan. 1, 1918 |
| 2,052,059 | Sengebusch | Aug. 25, 1936 |
| 2,148,824 | Lienzen | Feb. 28, 1939 |
| 2,218,833 | Sengebusch | Oct. 22, 1940 |
| 2,218,834 | Sengebusch | Oct. 22, 1940 |
| 2,228,297 | Betulander | Jan. 14, 1941 |

FOREIGN PATENTS

| Number | Country | Date |
|---|---|---|
| 85,768 | Sweden | Jan. 9, 1936 |